United States Patent
Weng et al.

(10) Patent No.: US 7,596,145 B2
(45) Date of Patent: Sep. 29, 2009

(54) AUTOMATIC SETTING METHOD FOR ATM NETWORK

(75) Inventors: Ming-Chuan Weng, Sinpu Township, Hsinchu County (TW); Chi-Wen Chen, Hsinchu City (TW)

(73) Assignee: Zyxel Communications Corp, Hsinchu (TW)

( * ) Notice: Subject to any disclaimer, the term of this patent is extended or adjusted under 35 U.S.C. 154(b) by 503 days.

(21) Appl. No.: 10/948,125

(22) Filed: Sep. 24, 2004

(65) Prior Publication Data
US 2006/0067322 A1 Mar. 30, 2006

(51) Int. Cl.
*H04L 12/28* (2006.01)
(52) U.S. Cl. ...................................... 370/401; 370/354
(58) Field of Classification Search ........................ None
See application file for complete search history.

(56) References Cited

U.S. PATENT DOCUMENTS

| 6,091,726 A * | 7/2000 | Crivellari et al. ............. 370/392 |
| 6,597,689 B1 * | 7/2003 | Chiu et al. .................. 370/354 |
| 2004/0052263 A1 | 3/2004 | Xu | |

\* cited by examiner

*Primary Examiner*—Jayanti K Patel
*Assistant Examiner*—Dargaye H Churnet

(57) ABSTRACT

An automatic setting method for ATM network is used in an information device for automatic connecting to an ATM network of an ISP office. At first an automatic configuration table is provided and includes a plurality sets of setting parameters of virtual path identifier (VPI)/virtual channel identifier (VCI) and encapsulation capacity for a plurality of default ISP offices. A user tries connection to the ISP office by selecting one set of the setting parameters as a connecting parameter to the ISP office and receives a reply message from the ISP office. The user selects another one set of the setting parameters as a connecting parameter to the ISP office when the connection fails and tries again until the connection to the ISP office successes.

2 Claims, 4 Drawing Sheets

AUTOMATIC SETTING METHOD FOR ATM NETWORK

BACKGROUND OF THE INVENTION

1. Field of the invention

The present invention relates to an automatic setting method for ATM network at office site, especially to an automatic setting method used in an xDSL device for setting virtual path identifier (VPI)/virtual channel identifier (VCI) and encapsulation capacity at ISP office site.

2. Description of the Prior Art

The rapid progress of computer network expedites the development of various network protocols. Among them, the asynchronous transfer mode (ATM) protocol in ADSL network is very attractive.

In conventional network, the transmission medium is shared by all communication terminals connected to the network and the data is sent through the transmission medium. Each of the communication terminals should be able to check whether the network is idle. In other word, the communication terminal must hold transmitted data when other communication terminal is transmitting data and then send data when the network is idle. The ATM protocol is developed to achieve point to point connection by switch, and the terminals in source end and destination end can use whole bandwidth of the transmission medium at the same time.

The data in current computer network is transmitted in packet form with different sizes. The packets with different sizes may also have different time delay. The time delay is difficult to estimate as network becomes more and more complicated.

The time delay problem becomes more serious when more and more video files and graphic files are transmitted through network. The time delay impacts the network as interference noise. Moreover, the variable-sized packet incurs difficulty to transmission of graphic and voice data.

ATM network overcome above-mentioned drawback by adopting small-sized and fixed-length packet for data transmission, this small packet is referred as cell. ATM network uses cell to enhance transmission rate, and reduce time delay and delay variation.

The conventional network implements the data link layer with hardware address. The hardware address is exclusive to an independent machine and there is no simple algorithm to resolve destination address by network system. Therefore, the source end just sends data to routing devices such as router and the delivery path of data is determined by network layer in OSI architecture.

However, the routing processed in the network layer will cause much computation effort. Therefore, the router will be the bottleneck of network transmission if the processor thereof is not such powerful.

Moreover, the router will examine each packet to determine its delivery path. After the source end and the destination end have already established connection, the router still needs to examine each packet between the source end and the destination end, even though the all the packets are transmitted through the same path between the source end and the destination end.

To address this issue, the ATM network solves routing problem by virtual connection, wherein the packets (cells) through a fixed path will not be examined again. In virtual connection, the path between two terminal ends is established by the first packet and then the data transmission between the two ends is directly managed by switch.

However, the ATM network is not completed complied with LAN infrastructure. For example, certain important fields are very important in cell frame of ATM such as Virtual Path Identifier (VPI), Virtual Channel Identifier (VCI), Payload Type (PT) and Cell Loss Priority (CLP) etc. The ATM switch used VPI/VCI field to guide the cell to desired output port.

The delivery path of the cell can be easily determined by VPI/VCI field because the VPI/VCI field has small bit size. The cells with the same VCI will be delivered through a virtual channel, and the cells with the same VPI will be delivered through a virtual path.

However, the ATM network is not completed complied with LAN infrastructure, the ISP offices in different locations or different countries may have different cell format. For example, the VPI/VCI field format in Taipei ISP office may be different to the VPI/VCI field format in Beijing ISP office. Moreover, the encapsulation capacity in Taipei ISP office may be different to the encapsulation capacity in Beijing ISP office. Therefore, the ATM switch should be setup by ISP administrator. The modem of xDSL subscriber can only be used for switches associated with the same ISP office. For example, the xDSL modem for switch in DC ISP office cannot be directly moved for switch in New York ISP office.

SUMMARY OF THE INVENTION

It is an object of the present invention to provide an automatic setting method to set up the setting parameters including VPI, VCI and encapsulation capacity for ATM network. The information device such as xDSL modem using the automatic setting method according to the present invention can be freely moved to other remote places or foreign countries without the need of reinstallation.

To achieve above object, the present invention provides an automatic setting method for ATM network. The method is used in an information device for automatic connecting to an ATM network of an ISP office.

The method comprises following steps. At first an automatic configuration table is provided and includes a plurality sets of setting parameters of virtual path identifier (VPI)/virtual channel identifier (VCI) and encapsulation capacity for a plurality of default ISP offices. The user tries connection to the ISP office by selecting one set of the setting parameters as a connecting parameter to the ISP office and receives a reply message from the ISP office. The user selects another one set of the setting parameters as a connecting parameter to the ISP office when the connection fails and tries again until the connection to the ISP office successes.

The above summaries are intended to illustrate exemplary embodiments of the invention, which will be best understood in conjunction with the detailed description to follow, and are not intended to limit the scope of the appended claims.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
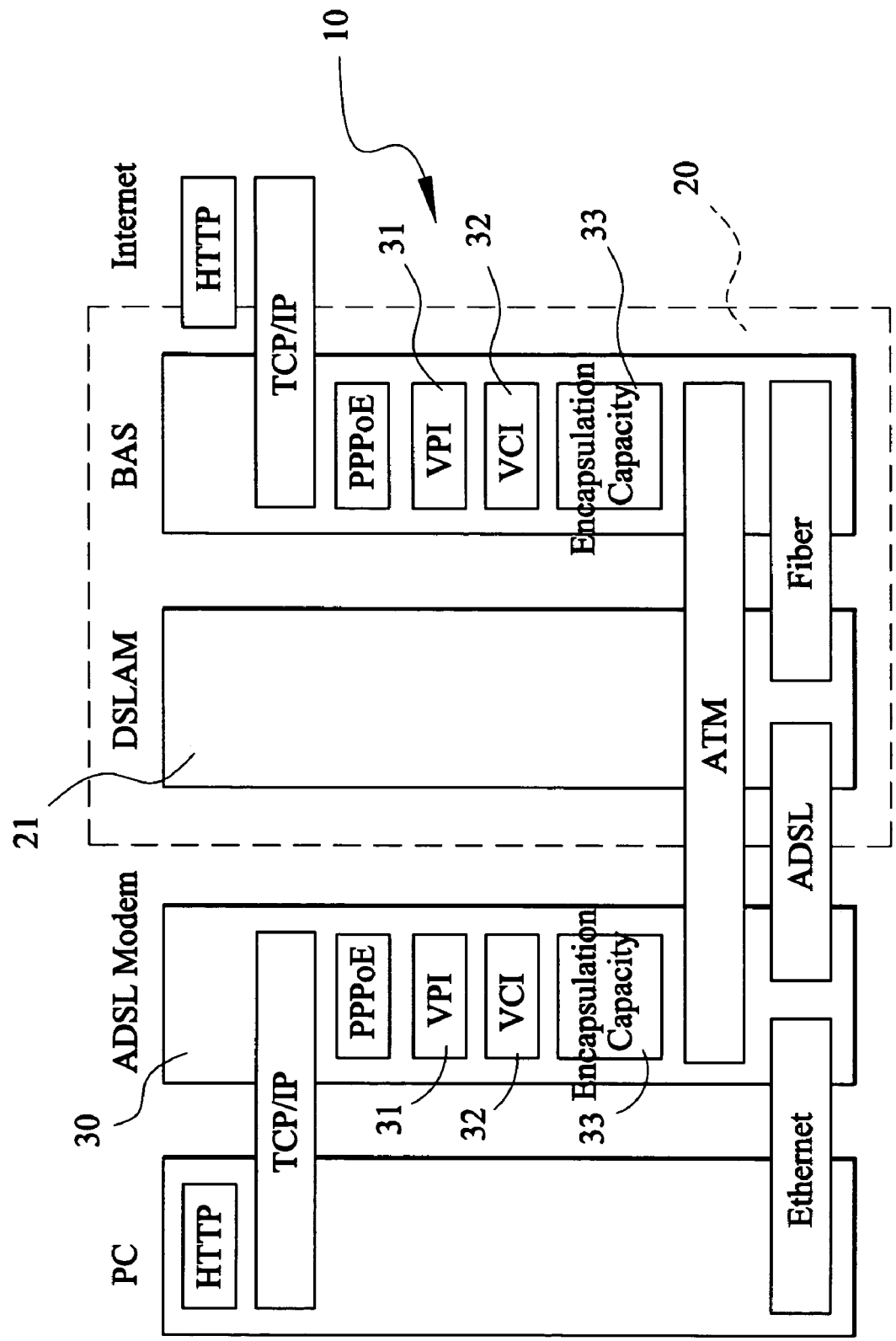
FIG. 1 is a schematic diagram of an ATM network according to the present invention.

FIG. 1 is a schematic diagram of an ATM network according to the present invention, wherein the ATM network 10 is, for example, an ATM-based WAN. The ATM-based WAN can use broadband dial up technology such as ADSL. An ISP office 20 generally comprises at least one ATM switch 21 such as a digital subscriber line access multiplexer (DSLAM) for accessing an ADSL unit 30. Through the ATM switch 21, the data of ISP office 20 can be transmitted to the ATM network 10 through multiple paths designated by Virtual Path Identifier (VPI) 31 and Virtual Channel Identifier (VCI) 32.

In the present invention, the setting parameters including VPI 31, VCI 32 and encapsulation capacity 33 of the ISP office 20 are automatically set in an information device 30 such as xDSL modem, router, gateway, IP sharing or wireless access point (WAP). Therefore, the ISP administrator needs not to set different setting parameters in the information device 30 for different ATM networks.

The information device 30 according to the present invention can be freely moved to any desired ATM-based network without reinstallation. For example, when the ADSL modem is moved from Taiwan to US, an automatic configuration setting according to the present invention can set up the ADSL modem automatically. All the user has to do is just apply ADSL service to local ISP office.

Figure 2:
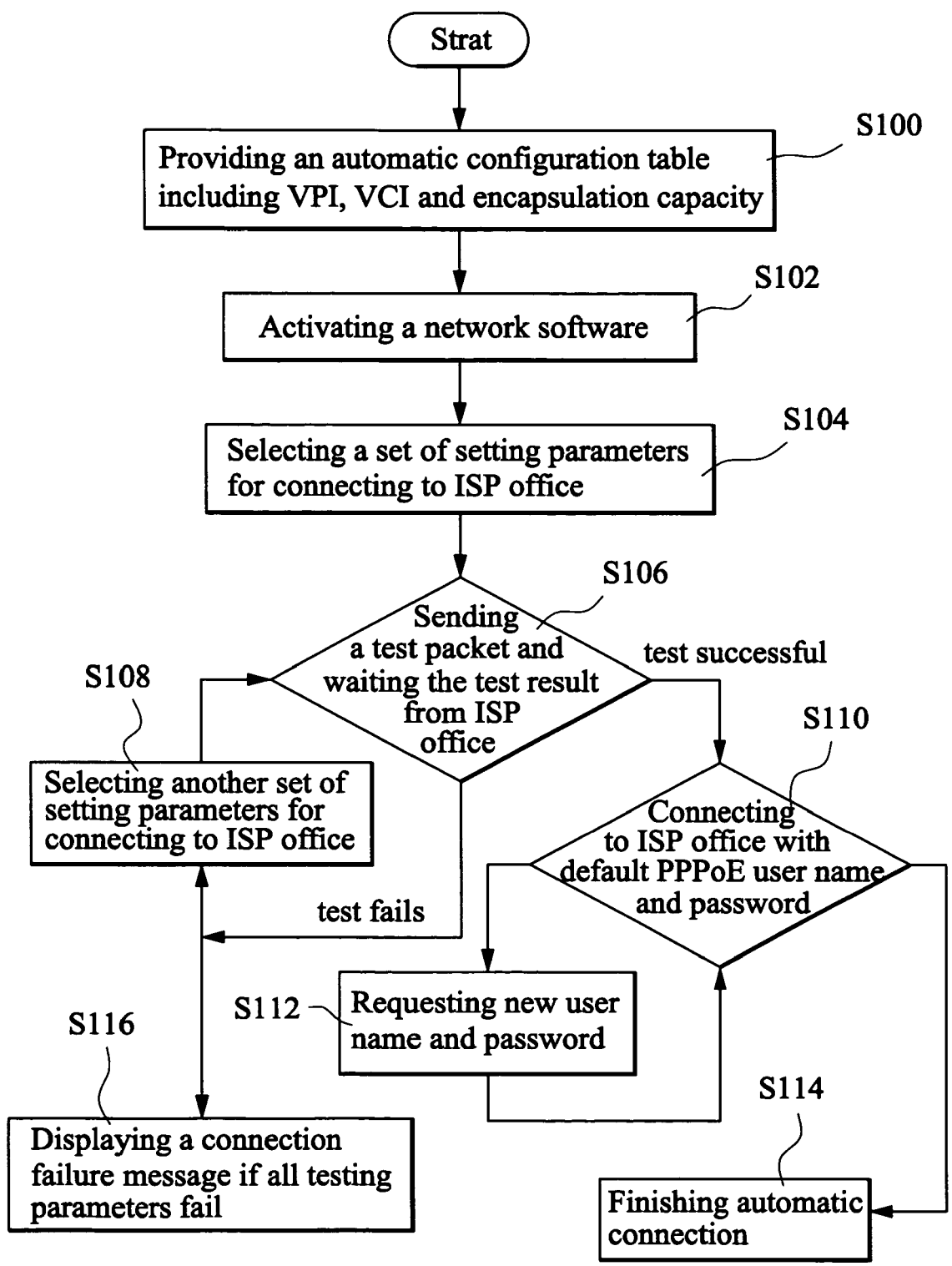
FIG. 2 is a flowchart of setting-up method according to the present invention.

FIG. 2 is a flowchart of setting-up method according to the present invention. Initially, an automatic configuration table is provided in the information device 30 in step S100, wherein the automatic configuration table comprises a plurality of setting parameters including VPI 31, VCI 32 and encapsulation capacity 33 for a plurality of default ISP offices. More particularly, the setting parameters including VPI 31, VCI 32 and encapsulation capacity 33 are stored in the automatic configuration table for potential ISP offices. The potential ISP offices include ISP offices in different cities like New York or DC, or in different countries like Taiwan or China. Therefore, the VPI/VCI setting parameters for New York, DC, Taiwan and China are stored in the automatic configuration table.

After the information device 30 according to the present invention is connected to a computer, and a network software such as a browser application, an e-mail application or other Internet application is activated, the information device 30 will dial up for connecting to the ISP office in step S102.

At this time, the information device 30 will select a set of setting parameters with response to the connected ISP office in step S104. The set of setting parameters include VPI, VCI and encapsulation capacity for connecting the ISP office.

The VPI and VCI parameters are used to fast determine packet transmission path and channel in ATM network and prevent redundant calculation of network layer. The encapsulation capacity parameter is used to determine the cell size in the ATM network.

Afterward, a connection-testing message is sent to user end. The user logs in the ISP office in the ATM network by the selected VPI, VCI and encapsulation capacity parameters and a test packet is sent to the ISP office. Afterward the user waits for the test result sent from ISP office in step S106.

If the test result fails, another set of setting parameter in the automatic configuration table is selected in step S108 and the connection test repeats in step S106 until the connection test is successful.

If the IPS site sends back a test message indicating that the selected VPI, VCI and encapsulation capacity parameters are correct for connection, a connection success message is sent to user computer and the VPI, VCI and encapsulation capacity parameters are reserved for further operation.

Afterward, a default username and a default password for PPPoE (Point to Point Protocol over Ethernet)/PPPoA (Point to Point Protocol over ATM) connection are sent to the ISP office in step S110 for connection. If the connection fails, a message for requesting new user name and password is sent in step S112. After the user inputs his user name and password, the user name and password are saved as default value and PPPoE/PPPoA connection to ISP office is tried again in step S110 by the saved user name and password. If the connection is successful, a message indicating successful setting and connection is sent to user computer in step S114.

In case that all set of setting parameters for VPI, VCI and encapsulation capacity parameters in the automatic configuration table cannot successfully make connection to ISP office, a connection failure message is sent to user end in step S116. The user can check network connection or find help from ISP administrator if the connection is failed.

Figure 3:
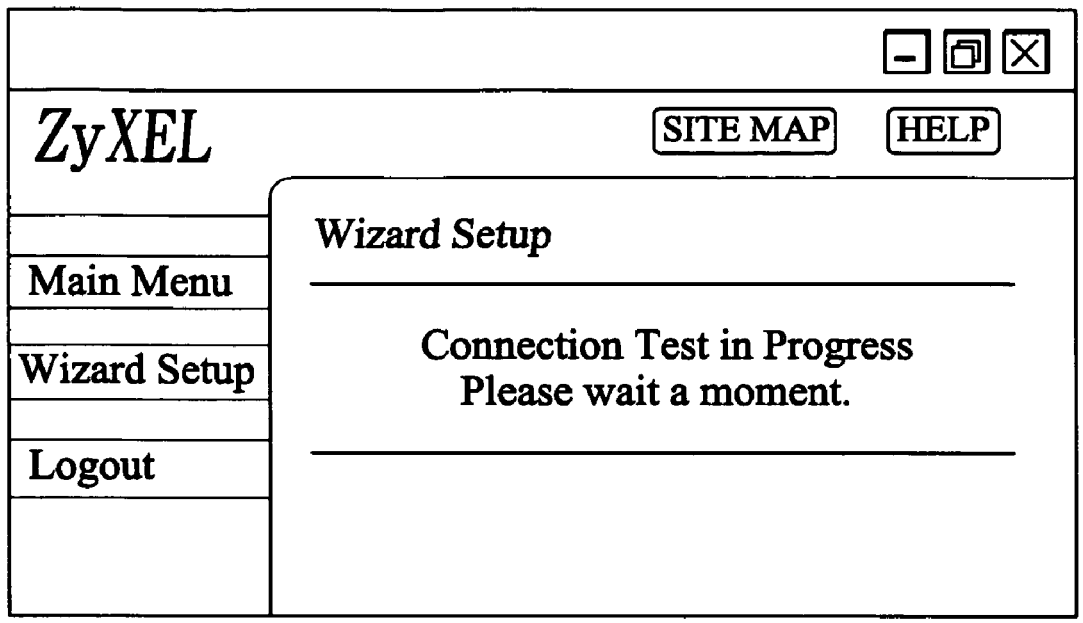
FIG. 3 shows a connecting message on computer monitor according to the present invention.

As can be seen from above description, there are four possible cases in the present invention:

Case 1: When user logs in for network connection, a connecting message is shown in computer monitor as shown in FIG. 3.

Figure 4:
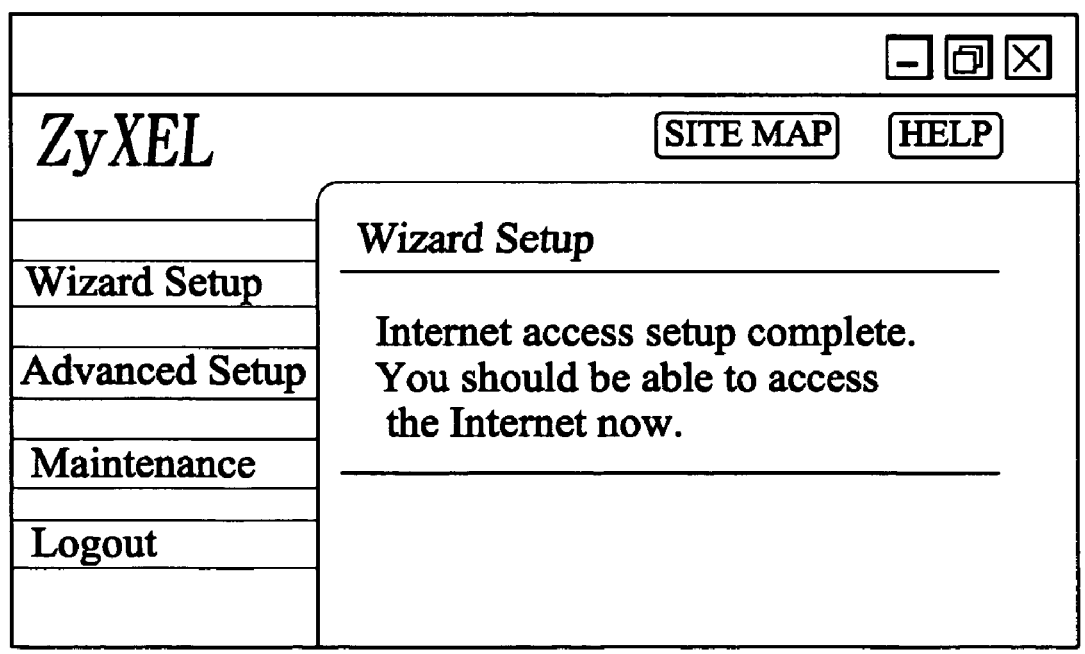
FIG. 4 shows successful log in message on computer monitor according to the present invention.

Case 2: In normal situation, the monitor shows successful login as shown in FIG. 4 if the information device has successful automatic connection.

Figure 5:
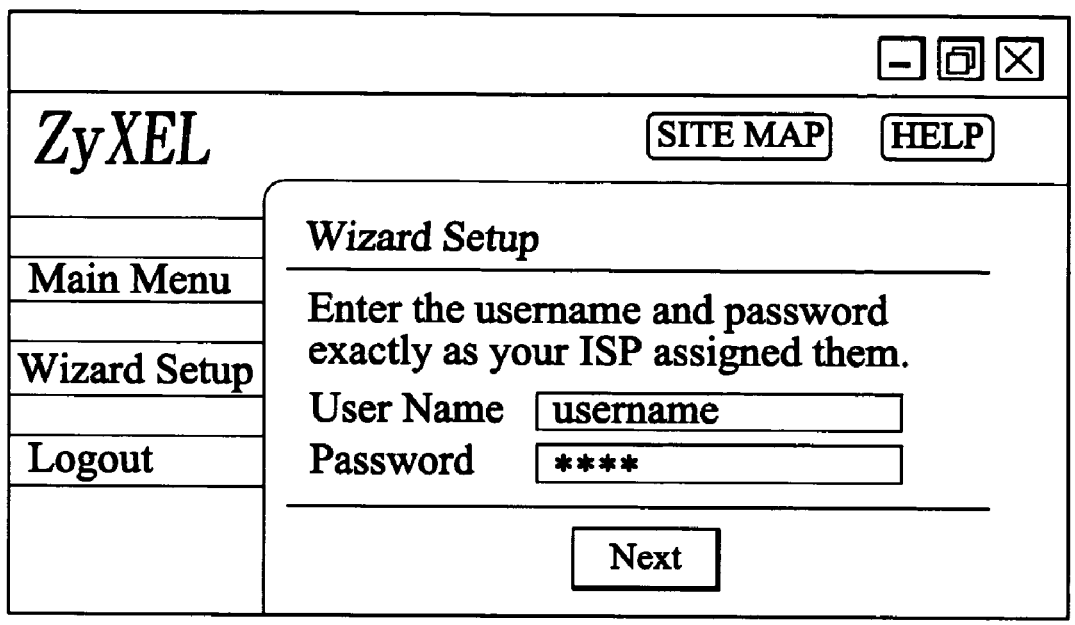
FIG. 5 shows PPPoE/PPPoA setting on computer monitor according to the present invention.

Case 3: If the automatic connection of the information device is finished but the user name/password is wrong for PPPoE/PPPoA connection, a screen requesting PPPoE/PPPoA setting appears on computer. The screen requests user to input user name/password again. When new user name/password is input and an execution key is pressed, the user name/password is saved and a connection test is tried. If the test fails, an error message is displayed and the screen requesting PPPoE/PPPoA setting appears again on computer. If the test successes, a screen indicating successful connection is displayed as shown in FIG. 5.

Figure 6:
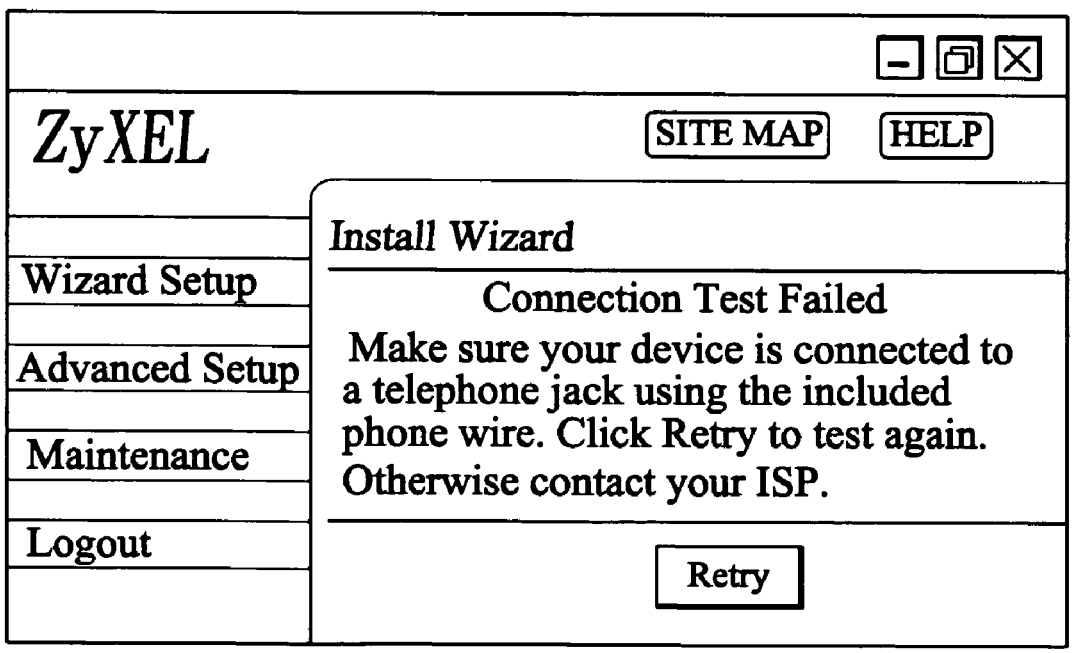
FIG. 6 shows connecting failure screen on computer monitor according to the present invention.

Case 4: A connecting failure screen is shown if the connection tests under all setting parameters have been conducted and connection still fails, as shown in FIG. 6. The connecting failure screen also asks user to check the connection of the information device and find help from ISP administrator.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An automatic setting method for ATM network, the method used in an information device for automatic connecting to an ATM network of an Internet Service Provider (ISP) office, the method comprising steps of:

providing an automatic configuration table including a plurality of sets of setting parameters for virtual path identifier (VPI)/virtual channel identifier (VCI) and an encapsulation capacity indicative of cell size for a plurality of default ISP offices;

connecting to the ISP office by selecting one set of the setting parameters as connecting parameters to the ISP office; and testing whether a connection to the ISP office is successful, and selecting another one set of the setting parameters as connecting parameters to the ISP office when a connection fails until connection to the ISP office succeeds;

after testing whether a connection to the ISP office is successful, sending a default username and a default password for Point to Point Protocol over Ethernet/Point to Point Protocol over ATM (PPPoE/PPPoA) connection to the ISP office when the test result from the ISP office indicates successful connection;

sending a message requesting new user name and password if the PPPoE/PPPoA connection fails; and saving the input user name and password as default value and reconnecting to the ISP office by PPPoE/PPPoA connection with new default user name and password.

2. The automatic setting method for ATM network as in claim 1, further comprising: sending a message indicating complete setting and successful connection to Internet.

* * * * *